US006534137B1

United States Patent
Vadhar

(10) Patent No.: US 6,534,137 B1
(45) Date of Patent: Mar. 18, 2003

(54) TWO-COMPONENT, HEAT-SEALABLE FILMS

(75) Inventor: Parimal M. Vadhar, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/415,991

(22) Filed: Oct. 12, 1999

(51) Int. Cl.[7] .......................... B32B 27/08; B32B 27/32; B65D 65/40
(52) U.S. Cl. .................... 428/34.9; 428/35.7; 428/36.7; 428/423.5; 428/424.5; 428/424.8; 428/474.9; 428/515; 428/520
(58) Field of Search ................................ 428/34.8, 34.9, 428/35.4, 35.7, 36.7, 423.5, 424.5, 424.8, 474.9, 515, 520; 206/459.5

(56) References Cited

U.S. PATENT DOCUMENTS

| 4,064,296 | A |   | 12/1977 | Bornstein et al. | ............. 428/35 |
| 4,302,565 | A |   | 11/1981 | Goeke et al. | ................. 526/88 |
| 4,302,566 | A |   | 11/1981 | Karol et al. | ................ 526/125 |
| 4,755,403 | A |   | 7/1988 | Ferguson | ..................... 428/35 |
| 4,765,857 | A |   | 8/1988 | Ferguson | .................... 156/229 |
| 5,206,075 | A |   | 4/1993 | Hodgson, Jr. | ............... 428/216 |
| 5,241,031 | A |   | 8/1993 | Mehta | ..................... 526/348.1 |
| 5,272,236 | A |   | 12/1993 | Lai et al. | ................ 526/348.5 |
| 5,278,272 | A |   | 1/1994 | Lai et al. | ................. 526/348.5 |
| 5,360,670 | A | * | 11/1994 | Yonezu et al. | ............. 428/412 |
| 5,374,459 | A |   | 12/1994 | Mumpower et al. | ....... 428/36.7 |
| 5,846,620 | A |   | 12/1998 | Compton | ................... 428/35.7 |
| 6,221,470 | B1 | * | 4/2001 | Ciocca et al. | ............... 428/218 |

FOREIGN PATENT DOCUMENTS

| WO | 90/3414 | 4/1990 |
| WO | 90/03093 | 2/1993 |
| WO | 98/22282 | 5/1998 |

OTHER PUBLICATIONS

Wild Et Al, *J. Poly. Sci. Poly. Phys. Ed.*, vol. 20, p 441 (1982).
1990 Annual Book of ASTM Standards, vol. 08.02, pp. 368–371.

* cited by examiner

Primary Examiner—Sandra M. Nolan
(74) Attorney, Agent, or Firm—Rupert B. Hurley, Jr.

(57) ABSTRACT

A two-component laminated multilayer film suitable for use in packaging articles such as pet food comprises a first component and a non-heat-shrinkable second component. The first component comprise an outer first film layer, an optional second film layer, and an optional third film layer. The first and third film layers comprise ethylene/alpha-olefin copolymer, while the second film layer is a modified ethylene copolymer. The second component comprises an outer fourth layer, an oxygen barrier fifth layer, sixth and seventh layers which serve as tie layers and are positioned on either side of the barrier layer. The multilayer film is heat sealable to itself and another film. The multilayer film has a total thickness of at least 2 mils, an impact strength of at least about 3 ft-lbs, an elongation at break of less than 300%, a tear propagation of at least 50 grams, a tensile modulus of at least 45,000 psi, total free shrink at 180° F. of from less than 50 percent.

18 Claims, 5 Drawing Sheets

TWO-COMPONENT, HEAT-SEALABLE FILMS

FIELD OF THE INVENTION

The present invention relates to an article comprising a multilayer film suitable for packaging end use, especially a multilayer film suitable for use in the packaging of relatively hard, granular bulk products, such as dry pet food. The multilayer film can be a laminate of two components wherein the first component comprises at least three film layers, and a second component has an oxygen barrier layer. The exposed first component surface is heat-sealable to both itself (end sealable) and the second component surface (lap sealable) while the exposed second component surface is heat-sealable to itself (gusset seal) as well to first component (lap sealable). The article preferably comprises a heat seal of the film to itself or another film. The external surface of the article comprises a film layer which can be free of anti-block and slip additives to improve stackability of the articles. The present invention also relates to packaged products in which the package comprises the article of the invention.

BACKGROUND OF THE INVENTION

For some time various products have been packaged in packages which comprise paper alone or paper in combination with a thermoplastic film. Such packaging has typically included a plurality of paper layers, with a relatively thin, flexible plastic film adhered to the inside paper layer, the film serving as a moisture and grease barrier. The paper provides the package with an exterior surface which is highly printable, as well as a stiffness which provides the packaging article, which is, for example, a gusseted bag, with an ability to be self-supporting and to provide the package with overall aesthetic qualities which consumers perceive as being desirable. Such paper packaging has been used in a variety of applications, particularly gusseted bags which are used in the packaging of dry granular material such as pet food, livestock feed, sugar, coffee, cookies, cereals, baking products such as cake mixes, crackers, chips, powdered milk, charcoal, cement, fertilizer, lime, pesticides, etc. The packaging can also be used to package cheese, in grated, ground, and/or block form.

More recently, paper-free plastic film packaging materials have been used for the packaging of a such products as pet food, etc. In order to obtain a desirable performance level, i.e., in terms of impact strength and toughness, such packaging films have contained relatively large quantities of polymers which are recognized.for their toughness and impact resistance, such as polyamide, polyester, and polyacrylonitrile. However, these polymers are also relatively expensive. It would be desirable if a comparably tough, impact-resistant package could be made from less expensive polymers. Moreover, it would also be desirable to provide packaging which provides a high $O_2$-barrier layer to increase the shelf-life of the product. In addition, in such plastic packaging, particularly in the packaging of hard, granular bulk products such as dry pet food, it has-been found that "dimples" tend to form in the plastic, thereby creating a rough, dimpled appearance in the outside of the package. It would be desirable to provide packaging which avoids this "dimpling" effect. Finally, it would be desirable to provide such packaging which is also relatively stiff, e.g., capable of providing a self-supporting gusseted bag.

In the case of the packaging of food in paper packaging, particularly pet food, it has heretofore been desirable to mix antioxidant into the food product, otherwise the food tends to lose metabolizable energy, exhibit decreased acceptability, including undesirable odors and flavors, protein degradation, and the development of health hazards in .the consuming animal. Thus, without antioxidant present, food packaged in paper packaging exhibits reduced shelf life and/or reduced product quality. It would be desirable to provide a type of packaging which requires less antioxidant, or even no antioxidant, to be mixed with a food product within the package, without the detrimental effects associated with the oxidation of the food product. In this manner, the expense of providing the antioxidant as well as the mixing of the antioxidant with the food product, are both reduced or avoided, while maintaining a good shelf life for the packaged food product.

U.S. Pat. No. 5,846,620 to Compton discloses a high strength bag which is made from a self-sealing heat-shrinkable film comprising at least three layers, e.g., LLDPE/EVA/LLDPE. U.S. Pat. Nos. 4,765,857 and 4,755, 403 to Ferguson also disclose such multilayer films.

PCT Application WO98/22282, published May 28, 1998 discloses tough and impact resistant bags which are substitutes for paper packaging while being made for the most part from less expensive polymers. The bags are made by laminating a three film layer first component (inside bag surface) to a second component (outside bag surface) containing at least a fourth film layer, e.g., a non-self-sealing blown monolayer film such as high density polyethylene, as substitutes for paper packaging. However, such bags have been difficult to form seals with second component surfaces, requiring offset printing and laminating steps to create an edge lip of first component which extends beyond the second component to permit better lap sealing by allowing first component overlap of a first component surface. Although this construction provides for both inside/outside and outside/outside seals, the extra steps result in added manufacturing expense. Moreover, while large bags require good stackability on a pallet, the second component film employed requires slip and antiblock additives for processing, resulting in a slippery outer surface of the bag, hindering stackability. Moreover, embodiments which employ heat-shrinkable, unblown or solid state oriented second component equivalent barrier film (Examples 1 to 4) exhibit reduced interply adhesion which results in weak gusset seal in the bags. Finally, difficulty in maintaining repeat length of the bag arises when temperatures encountered during processing,. e.g., during ink drying and laminating adhesive drying, result in unintended shrinkage.

Accordingly, it would be useful to provide plastic bags which are sufficiently inexpensive to compete with paper-containing packages while providing a high quality appearance and feel to the consumer. Such articles would comprise a multilayer film having excellent optics and improved ink adhesion for appearance, high coefficient of friction (COF) on its outer surface for stackability of packages made with such film, strong interply adhesion to promote both gusset sealing and lap sealing for bag strength, as well as reduced shrinking tendency at processing temperatures of 110° to 150° F. to maintain repeat length during manufacture.

SUMMARY OF THE INVENTION

The present invention is directed to a multilayer film as well as an article which is suitable for packaging end-use and which comprises a multilayer film. The majority of the multilayer film is made from relatively inexpensive polymers. Nevertheless, it has been found that the multilayer film can be provided with toughness and impact resistance characteristics which are adequate for the packaging of various products, including dry pet food. Moreover, it has been found that the multilayer film can be provided with toughness and impact resistance characteristics which are comparable to, or even superior to, plastic packaging materials which comprising higher amounts of more expensive polymers such as nylon, polyester, and polyacrylonitrile.

In addition, the multilayer film in the article of the present invention comprises an $O_2$-barrier layer which increases the shelf life of, for example, a packaged food product therein. The presence of the $O_2$-barrier layer reduces or eliminates the need to add antioxidants, etc. to a food product, such as pet food, to prevent the oxidative rancidity, off-flavors, and off-odors of the packaged food product. The multilayer film also can be provided with a stiffness which, if the multilayer film is converted to a gusseted bag, provides a self-supporting packaged product. Preferably, the multilayer film is resistant to shrinkage at processing temperatures of 110° to 150° F. to maintain repeat length during manufacture. The multilayer film can also be provided with: (a) high gloss, to provide a packaged product having enhanced aesthetic appeal, (b) good resistance to tear propagation, (c) printing on the surface of the film, and/or printing which is trapped between the layers of the film, and (d) high impact strength.

As a first aspect, the present invention is directed to a two-component laminated multilayer film which comprises at least 5 layers. The two-component laminated multilayer film comprises:

I. a first component comprising:
 (A) an outer first film layer comprising ethylene/alpha-olefin copolymer;
 (B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;
 (C) an optional third film layer comprising ethylene/alpha-olefin copolymer; and
II. a non heat-shrinkable second component laminated to said first component, said second component comprising:
 (D) an outer fourth film layer which comprises at least one member selected from the group consisting of ethylene/alpha-olefin copolymer and ethylene/unsaturated ester copolymer;
 (E) a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester;
 (F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and
 (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

wherein the multilayer film is sealable to at least one member selected from the group consisting of itself and another film, and said outer fourth film layer is heat sealable to itself as well as to said outer first film layer.

By "non heat-shrinkable second component" is meant that the second component, measured independently of the laminate, has a total free shrink (i.e., L+T), of less than 5 percent at 180° F., with the quantitative determination being carried out according to ASTM D 2732, hereby incorporated in its entirety, by reference thereto. Conversely, the term "heat-shrinkable" as used herein means a total free shrink of at least 5 percent at 180° F., preferably at least 15 percent at 180° F., with the quantitative determination being carried out according to ASTM D 2732, hereby incorporated, in its entirety, by reference thereto. The multilayer film, i.e., the two component laminate of the present invention, can be heat-shrinkable. If heat-shrinkable, the multilayer two component laminate film preferably has a total free shrink (i.e., machine direction plus transverse direction or L+T), of at least 5 to 50 percent, at 180° F., more preferably, a total free shrink of from about 10 to 30 percent at 180° F., more preferably, a total free shrink of from about 10 to 20 percent at 180° F.

Preferably, the first component is heat-shrinkable and heat sealable to itself, the second component comprises a non heat-shrinkable film oriented at about or above its melt temperature, e.g., at about 440° F. The multilayer film can have a total thickness of at least 2 mils, an impact strength of at least about 3.0 ft-lbs (preferably, at least 4 ft-lbs, more preferably, at least 5 ft-lbs, more preferably, at least 6 ft-lbs) a tensile strength at break of at least 8,000 pounds per square inch (preferably, at least 9,000, more preferably, at least 10,000, more preferably, at least 11,000), an elongation at break of less than 300% (preferably, less than 250, more preferably, less than 200), a tear propagation of at least 50 grams, preferably from 80 to 800 grams, more preferably from 100 to 400 grams, a tensile modulus of at least 45,000 psi (preferably, from 45,000 to 250,000, more preferably, from about 45,000 to 100,000), total free shrink at 150° F. of less than 10%, total free shrink at 200° F. of less than 30%, elastic recovery of at least 80%, preferably at least 85%, more preferably at least 88%, when subjected to stress or extension of about 10%, and having a first component to second component seal-strength of at least 4 pounds/inch at a seal time of 1.5 seconds on a VERTROD® impulse heat sealing machine with wires top and bottom, 70% seal power, total dwell time 5.0 seconds, and room temperature cooling.

Structures for the multilayer film of the present invention are as follows:
 First Layer: seal layer and inside layer (e.g., inside layer of sealed article), preferably ethylene/alpha-olefin copolymer;
 Second Layer: inner layer preferably comprising at least one member selected from the group consisting of ethylene/unsaturated ester copolymer (especially ethylene/vinyl acetate copolymer) and other suitable for self welding, such as ethylene/methyl acrylate copolymer, ethylene/butyl acrylate, ethylene/methacrylic acid copolymer, etc;
 Third Layer: inner layer preferably comprising ethylene/alpha-olefin copolymer;
 Fourth Layer: outside layer preferably comprising ethylene/alpha-olefin copolymer;

Fifth Layer: inner oxygen barrier layer comprising at least one member selected from the group consisting of ethylene/vinyl alcohol copolymer (EVOH), vinylidene chloride copolymer, polyamide, polyester, polyacrylonitirile, polyalkylene carbonate, etc.;

Sixth Layer: a first tie layer preferably comprising at least one member selected from the group consisting of ethylene/unsaturated ester copolymer (especially ethylene/vinyl acetate copolymer and modified ethylene/unsaturated ester copolymers), anhydride-modified ethylene/alpha-olefin copolymer, etc., the sixth layer being between the fourth layer and the fifth layer;

Seventh Layer: a second tie layer preferably comprising at least one member selected from the group consisting of ethylene/unsaturated ester copolymer (especially ethylene/vinyl acetate copolymer and modified ethylene/unsaturated ester copolymers), anhydride-modified ethylene/alpha-olefin copolymer, the seventh layer being between the third layer and the fifth layer;

Eighth Layer: a layer preferably comprising at least one member selected from the group consisting of ethylene/alpha-olefin copolymer (e.g., low density polyethylene) ethylene/unsaturated ester copolymer (e.g., ethylene/vinyl acetate copolymer), the eighth layer being between the third and seventh layers, the eighth layer contacting the laminating adhesive between the first component and the second component;

Ninth Layer: a laminating adhesive layer, preferably polyurethane based, the ninth layer being between the third and eighth layers;

Tenth Layer: an oxygen barrier layer (preferably a supplemental layer) preferably comprising polyamide, the tenth layer being between the fifth and sixth layers;

Eleventh Layer: an oxygen barrier layer (preferably a supplemental layer) preferably comprising polyamide, the eleventh layer being between the fifth layer and the seventh layer.

Thus, a preferred structure for the multilayer film of the present invention is as follows: 1/2/3/9/8/7/11/5/10/6/4. Another preferred structure is 1/2/3/9/8/7/5/6/4; yet another is 1/2/3/9/8/7/11/10/6/4; yet another is 1/2/3/9/8/7/10/6/4; yet another is 1/9/8/7/11/5/10/6/4; yet another is 1/9/8/7/5/6/4; yet another is 1/9/8/7/10/6/4. Typically, layers 1, 2, and 3 make up the first component, while layers 4, 5, 6, 7, 8, 10, and 11 make up the second component, with layer 9 making up the laminating adhesive used to laminate the first component to the second component. Clearly, in the above-described multilayer films, some embodiments do not utilize all of the listed layers.

In a more preferred embodiment, the fifth film layer comprises EVOH, the tenth film layer comprises polyamide and the eleventh film layer comprises polyamide. Polyamides, such as nylon, e.g., nylon-6, can provide additional stiffness giving additional structural support as well as providing an oxygen barrier multilayer film which is less likely to undesirably stretch or misregister during processing. The combination of EVOH and polyamide can also contribute to improved tearability of the resulting product.

Preferably, the second film layer comprises ethylene/unsaturated ester copolymer, the third film layer comprises ethylene/alpha olefin copolymer, the fourth film layer comprises ethylene/alpha-olefin copolymer, the fifth film layer comprises EVOH, the sixth film layer comprises ethylene/unsaturated ester copolymer, the seventh film layer comprises ethylene/unsaturated ester copolymer, the eighth film layer comprises ethylene/alpha-olefin copolymer, the ninth film layer comprises polyurethane adhesive, the tenth film layer comprises polyamide and the eleventh film layer comprises polyamide.

Even more preferably, the first film layer comprises at least one member selected from the group consisting of LLDPE and LDPE, said second film layer comprises EVA, said third film layer comprises at least one member selected from the group consisting of LLDPE and LDPE, said fourth film layer comprises at least one member selected from the group consisting of LLDPE and LDPE, said sixth film layer comprises EVA, said seventh film layer.comprises EVA, said eighth film layer comprises at least one member selected from the group consisting of LLDPE and LDPE ethylene/alpha-olefin copolymer, said ninth film layer comprises polyurethane adhesive, said tenth film layer comprises nylon and said eleventh film layer comprises nylon.

The multilayer film of the invention can have a first component which comprises a downward cast solid state oriented film biaxially oriented to a total orientation (L+T) of from about 5× to 25×, preferably 6× to 20×, more preferably 9× to 16×, at a temperature of from about 200° to 280° F. The second component can comprise a non heat-shrinkable melt-oriented upwardly blown film, i.e., a film which is oriented at or near its melting point, i.e., a non solid state-oriented film.

The multilayer film can have desirable seal properties, e.g., a first component to second component seal strength of at least 4 pounds/inch at a seal time of 1.5 seconds on a VERTROD® impulse heat sealing machine with wires top and bottom, 70% seal power, total dwell time 5.0 seconds, and room temperature cooling, as well as a first component to second component seal strength of at least 6 pounds/inch at a seal time of 2.0 seconds on a VERTROD® impulse heat sealing machine with wires top and bottom, 70% seal power, total dwell time 5.0 seconds, and room temperature cooling. Second component to second component seal strength can be at least 8 pounds/inch at a seal time of 1.5 seconds on a VERTROD® impulse heat sealing machine with wires top and bottom, 70% seal power, total dwell time 5.0 seconds, and room temperature cooling.

The multilayer film of the invention can have at least one of its film layers comprising pigment. The second component can have an outside surface which contains no added antiblock additive and no added slip additive. The resulting film has adequate machinability in the absence of such additives as well as enhanced stackability of product due to increased coefficient of friction (COF). The second component is preferably no greater than 1.5 mil thick.

The first component can comprise a crosslinked polymer network. Preferably, the crosslinked polymer network is produced by irradiation, preferably irradiation at a level of from about 0.5 to 15 MR (i.e., 5 to 150 kGy); more preferably, from about 1 to 8 MR (i.e., 10–80 kGy), still more preferably, from about 3 to 5 MR (i.e., 30–50 kGy).

The multilayer film can have a tear propagation of 100 to 300 grams, an outside surface having a gloss of at least 70 percent, a static COF of at least 0.6 and a kinetic COF of at least 0.5, as measured between outer fourth film layer surfaces, i.e., the surfaces involved in package to package contact during stacking of bags.

The multilayer film can comprise trap printing between the third layer and the fourth layer.

In another aspect, the present invention relates to a sealed article comprising a two-component laminated multilayer film which comprises:

I. a first component comprising:
  (A) a first film layer which is an inside film layer comprising ethylene/alpha-olefin copolymer;
  (B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

(C) an optional third film layer comprising ethylene/alpha-olefin copolymer; and II a non heat-shrinkable second component laminated to said first component, said second component comprising:

(D) a fourth film layer which comprises at least one member selected from the group consisting of ethylene/alpha-olefin copolymer and ethylene/unsaturated ester copolymer;

(E) a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester;

(F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer; anhydride-modified ethylene/ester copolymer, acid-modified ethylene/alpha-olefin copolymer, and acid-modified ethylene/acid copolymer;

wherein the article comprises a seal of the film to at least one member selected from the group consisting of itself and another film, and a surface of said second component is heat sealable to itself as well as to said inside layer (A) of said first component.

Preferably, the article comprises a bag. Although the bag is preferably a gusseted bag, which can have side gussets or a bottom gusset, the bag can also be a non-gusseted end-seal bag or a non-gusseted side seal bag.

In a third embodiment, the present invention relates to a packaged product comprising a two-component laminated multilayer film which comprises:

I. a first component comprising:

(A) a first film layer which is an inside film layer comprising ethylene/alpha-olefin copolymer;

(B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

(C) an optional third film layer comprising ethylene/alpha-olefin copolymer; and II. a non heat-shrinkable second component laminated to said first component, said second component comprising:

(D) a fourth film layer which comprises at least one member selected from the group consisting of ethylene/alpha-olefin copolymer and ethylene/unsaturated ester copolymer;

(E) a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester;

(F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer, wherein the packaged product comprises a seal of the film to at least one member selected from the group consisting of itself and another film, and a surface of said second component is heat sealable to itself as well as to said inside layer (A) of said first component.

The package comprises the article in accordance with the present invention, preferably a preferred article according to the present invention. The article serves as a package which surrounds a packaged product which comprises hard, flowable, particulates, and/or a non-flowable product comprising cheese. Preferably, the hard, flowable particulates comprise food. Preferably, the food product comprises at least one member selected from the group consisting of pet food, livestock feed, sugar, coffee, cookies, cereal, cake mix, crackers, chips, powdered milk, and plant food. Other hard, flowable products include charcoal, cement, fertilizer, lime, pesticide, and herbicide.

At least one film layer can comprise pigment. The article can also have trap printing between the third layer and the fourth layer. Alternatively, printing can be present on an outside surface of the second outer layer.

DETAILED DESCRIPTION OF THE INVENTION

Figure 1:
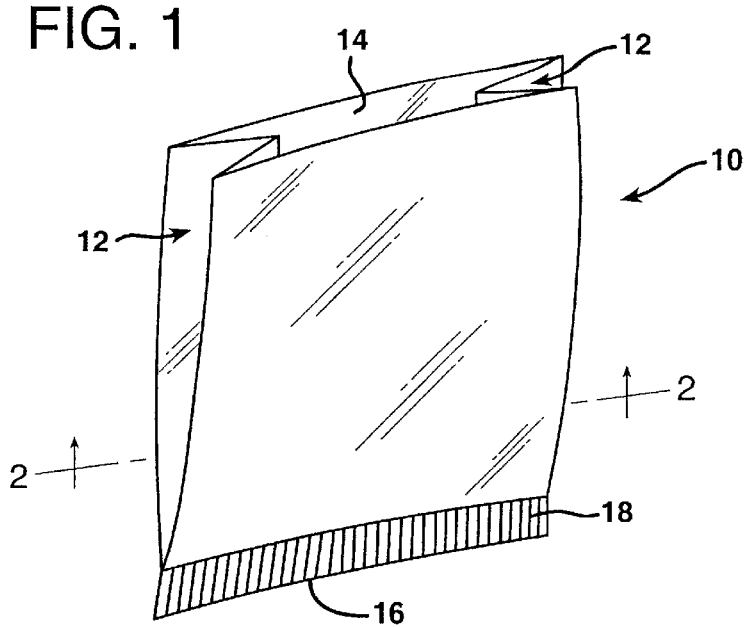
FIG. 1 illustrates a perspective view of a side-gusseted bag in accordance with the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of an outer film surface to a second region of an outer film surface, wherein the seal is formed by heating the regions to at least their respective seal initiation temperatures. The sealing can be performed by any one or more of a wide variety of manners, such as using a heat seal technique (e.g., melt-bead sealing, thermal sealing, impulse sealing, dielectric sealing, radio frequency sealing, ultrasonic sealing, hot air, hot wire, infrared radiation, etc.).

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyalkylene carbonate, polyacrylonitrile, etc., as known to those of skill in the art.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent, more preferably, from about 85 to 100 mole percent.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. Lamination is described in U.S. Pat. No. 5,374,459, to Mumpower et al. Lamination can be carried out by the application of polyurethane or other conventional lamination adhesive to either or both of the substrate films. Bonding is accomplished by techniques well known in the lamination art.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." As used herein, the phrase "total orientation" refers to the sum of the orientation in the longitudinal direction (machine direction) plus orientation in the transverse direction. In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S.

Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution (Mw/Mn); composition distribution breadth index (CDBI), narrow melting point range, and single melt point behavior. The molecular weight distribution .(Mw/Mn), also known as "polydispersity," may be determined by gel permeation chromatography. Homogeneous ethylene/alpha-olefin copolymers which can be used in the present invention preferably have an Mw/Mn of less than 2.7, more preferably from about 1.9 to 2.5, still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow. melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated-at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a C3–C20 alpha-monoolefin, more preferably, a C4–C12 alpha-monoolefin, still more preferably, a C4–C8 alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl. monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of, for example, anhydride-modified polymers such as anhydride-modified LLDPE, anhydride-modified EVA, etc., such polymer being prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer, as well as modified polymers made by derivitization of a polymer after its polymerization. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

The term "ionomer", as used herein, refers to a product of an ionic polymerization, i.e., a polymer containing interchain ionic bonding. Preferably, the ionomer comprises at least one member selected from the group consisting of a thermoplastic resin based on metal salt of an alkene/acid copolymer, more preferably, a thermoplastic resin based on metal salt of ethylene/acid copolymer, still more preferably, metal salt of ethylene/methacrylic acid copolymer. As used herein, the term "ionomer" also includes ethylene/acrylic acid copolymer and ethylene/acid/acrylate terpolymer.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (™) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY® resins, and ENGAGE® resins, available from the Dow Chemical Company, of Midland, Mich.), as well as TAFMER (™) linear homogeneous ethylene/alpha-olefin copolymer resins obtainable from the Mitsui Petrochemical Corporation. The phrase ethylene/alpha-olefin copolymer is also inclusive of ethylene/alpha-olefin copolymers produced from mixed catalysts, e.g. using a combination of Ziegler Natta catalysis and single site catalysis such as metallocene catalysis. Exemplary of such resins are, for example, the line of resins known as Elite® enhanced polyethylene resins, available from The Dow Chemical Company, of Bayport, Tex. These resins are known to contain interpenetrating polymer networks ("IPN's"). Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT® resin, and TAFMER® resin, this latter group of resins has a relatively large number of short branches rather than the longer branches present in LDPE and MDPE. AFFINITY® resins and ENGAGE® resins have a relatively large number of short branches in combination with a relatively small number of long-chain branches. LLDPE usually has a density ranging from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die. Moreover, an outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer to the two other layers it is, between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing.of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc.), polyamide, polyester (e.g., polyethylene terephthalate glycol), ethylene/ester copolymer (e.g., ethylene/vinyl acetate copolymer), ionomer, etc.

As used herein, the phrase "heat seal" refers to joint between a film and another object, preferably another film, via any one or more of a number of means for sealing through the use of heat, including thermal sealing, melt bead sealing, impulse sealing, dielectric sealing, ultrasonic sealing, etc.

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state decreases. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained). Preferably, the heat shrinkable film has a total free shrink (i.e., machine direction plus transverse direction), as measured by ASTM D 2732, of at least 10 percent at 180° F., more preferably at least 20 percent, still more preferably, at least 25 percent, and, yet still more preferably, at least 30 percent.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise non-adhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 180° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto.

The multilayer films useful in the article and process of the present invention has at least 5 layers (preferably from 5 to 20 layers), and preferably has from 5 to 11 layers, still more preferably, from 7 to 11 layers, and yet still more preferably, 11 layers). However, so long as the multilayer film has at least 5 layers, the multilayer film can have any further number of additional layers desired, so long as the film provides the desired properties for the particular packaging operation in which the film is used, e.g. $O_2$-barrier characteristics, free shrink, shrink tension, optics, modulus, seal strength, etc.

The multilayer film used in the present invention can have any total thickness desired, so long as the film provides the desired properties for the particular packaging operation in which the film is used. Preferably, the film has a total thickness of less than about 20 mils, more preferably the film has a total thickness of from about 2 to 20 mils, still more preferably from about 2 to 10 mils, and yet still more preferably, from about 2 to 6 mils.

Optionally, but preferably, the film of the present invention is irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 0.5–15 MR (5–150 kGy), more preferably 1–8 MR (10–80 kGy), still more preferably, about 3 to 5 MR (30–50 kGy). As can be seen from the descriptions of preferred films for use in the present invention, the most preferred amount of radiation is dependent upon the film composition, thickness, etc., and its end use. Chemical crosslinking can also be utilized, together with electronic crosslinking, or in place of electronic crosslinking.

As is known to those of skill in the art, various polymer modifiers may be incorporated for the purpose of improving toughness and/or orientability or extensibility of the film. Other modifiers which may be added include: modifiers which improve low temperature toughness or impact strength, and modifiers which reduce modulus or stiffness. Exemplary modifiers include: styrene-butadiene, styrene-isoprene, and ethylene-propylene.

In the packaging of dry pet food, one of the main concerns is oxidation of the dry food product. Oxidation in pet food comes from the fat added to the pet food, mineral premixes, and flavor additives such as bloodmeal. Oxidation is a concern because animals begin to discriminate against food that has reached a peroxide value of 20 microequivalent/kg. Peroxide value is the pet food industry standard indicator of oxidation. To combat oxidation, pet food manufacturers use chemical and natural antioxidants (food preservatives). Antioxidants allow for the stability of vitamins, minerals, fatty acids and protein, and the reduction of oxidative rancidity, off flavors and off odors. Natural antioxidants are more expensive than chemical antioxidants. Natural antioxidants include tocopherols, acetic acid and citric acid. Chemical antioxidants include ethoxyquin. A long-term study on the side effects of chemical antioxidants are not available. However, by providing packaging which contains a barrier to $O_2$, there can be a reduction in the amount of natural and/or chemical preservatives used in the packaging. In addition, the presence of an $O_2$-barrier lengthens the shelf life of the packaged product.

Figure 2A:
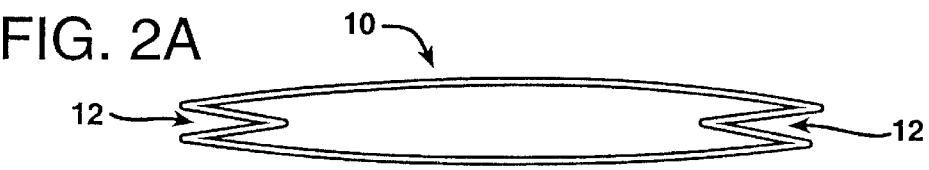
FIG. 2A illustrates a cross-sectional view of a first embodiment of the side-gusseted bag illustrated in FIG. 1.
Figure 2B:
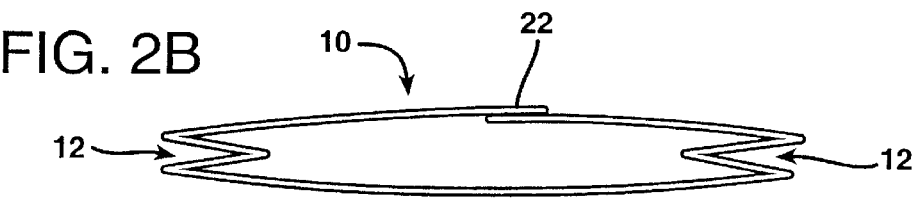
FIG. 2B illustrates a cross-sectional view of a second embodiment of the side-gusseted bag illustrated in FIG. 1.
Figure 2C:
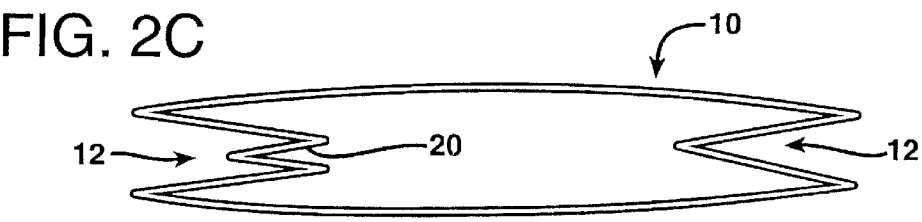
FIG. 2C illustrates a cross-sectional view of a third embodiment of the side-gusseted bag illustrated in FIG. 1.

FIG. 1 illustrates a perspective view of gusseted bag 10 in accordance with the present invention. Gusseted bag 10 has side gussets 12, open top 14, bottom edge 16, and seal region 18. FIGS. 2A, 2B, and 2C illustrate various cross-sectional views taken through section 2–2 of FIG. 1. FIG. 2A illustrates a tubular, seamless cross-section of gusseted bag 10, including side gussets 12. FIG. 2B illustrates a tubular cross-sectional view of gusseted bag 10, including side gussets 12 and lap seal 22. FIG. 2C illustrates a tubular cross-section of gusseted bag 10, including side gussets 12 and side-seal 20 (a fin seal).

Figure 3:
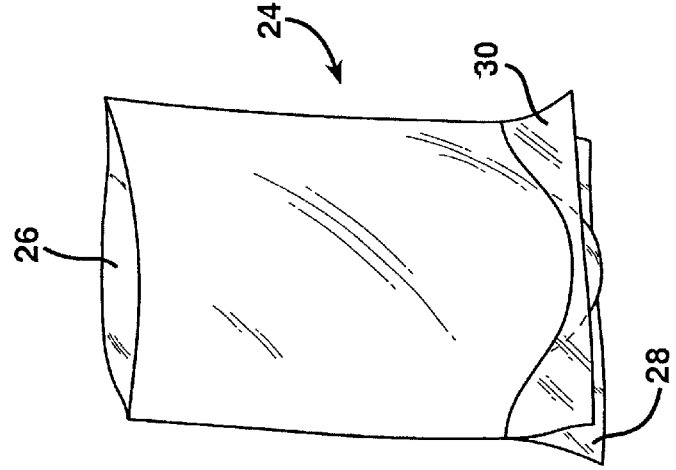
FIG. 3 illustrates a perspective view of a bottom-gusseted bag in accordance with the present invention.

FIG. 3 illustrates a perspective view of alternative gusseted bag 24 having open top 26, bottom gusset 28, and bottom seal region 30.

Figure 5:
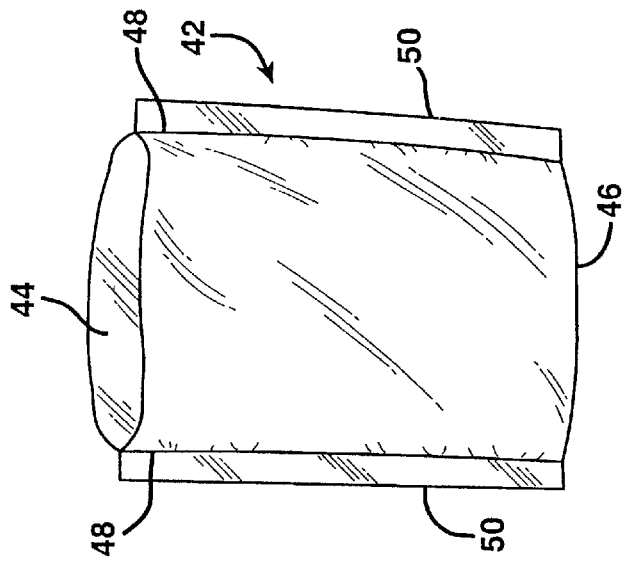
FIG. 5 illustrates a lay-flat view of an side-seal bag in accordance with the present invention.
Figure 4:
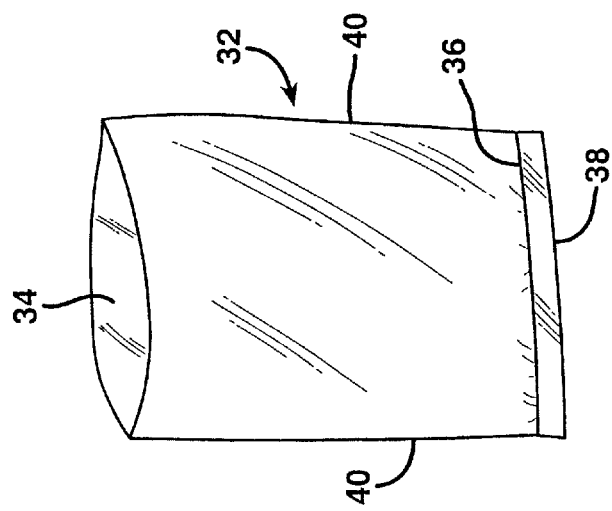
FIG. 4 illustrates a lay-flat view of an end-seal bag in accordance with the present invention.

FIG. 4 illustrates a schematic view of non-gusseted end-seal bag 32, having open top 34, end seal 36, bottom edge 38, and seamless (folded) side edges 40. FIG. 5 illustrates a schematic view of non-gusseted side-seal bag 42 having open top 44, seamless (folded) bottom edge 46, side seals 48, and side edges 50.

Figure 6:
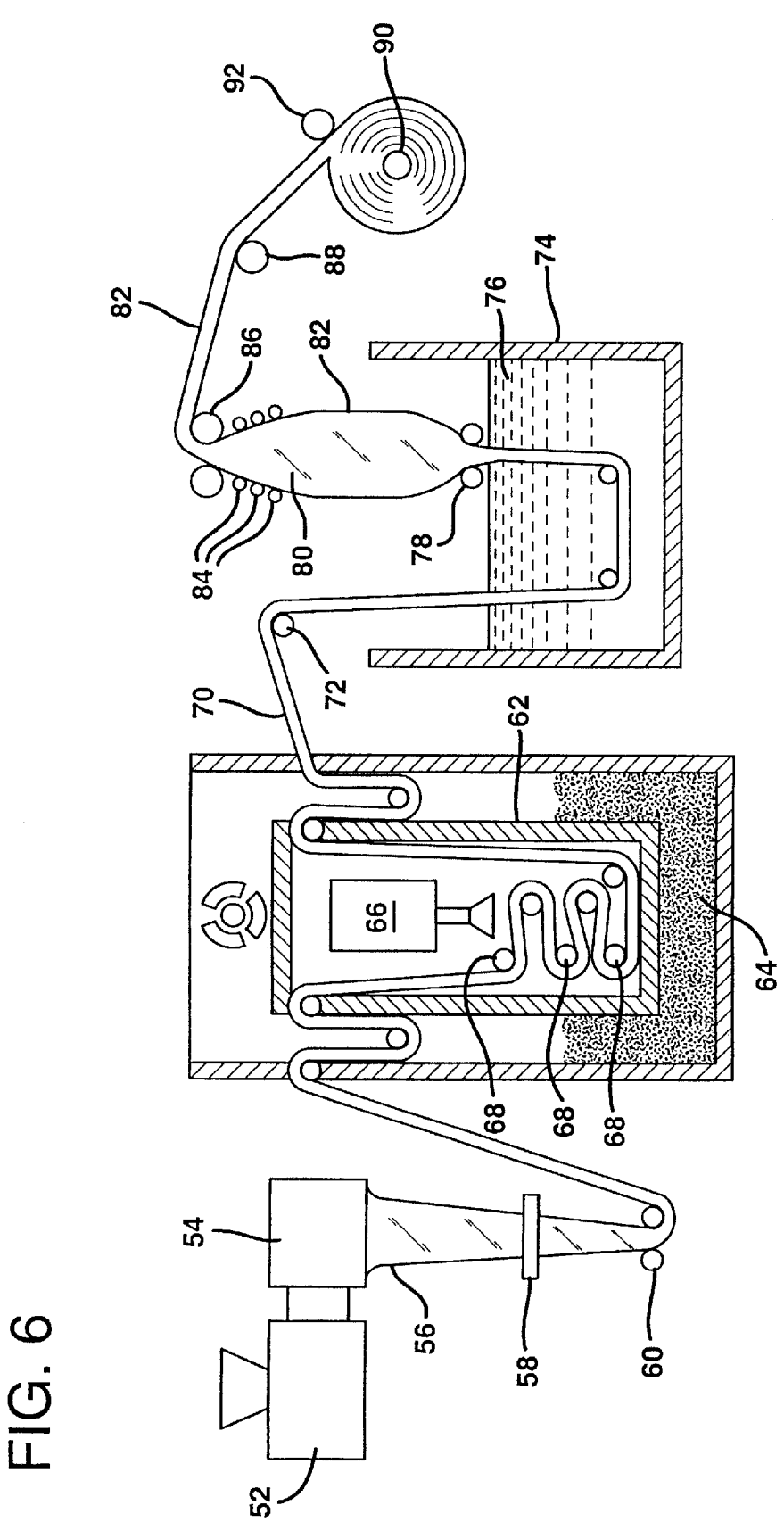
FIG. 6 illustrates a schematic view of a process for downward casting a solid state oriented, heat shrinkable part of the multilayer film of the present invention.

FIG. 6 illustrates a schematic of a preferred process for producing heat shrinkable solid state-oriented multilayer films suitable for use in the article of the present invention, e.g., first component films. In the process illustrated in FIG. 6, solid polymer beads (not illustrated) are fed to a plurality of extruders 52 (for simplicity, only one extruder is illustrated).

Inside extruders 52, the polymer beads are forwarded, melted, and degassed, following which the resulting bubble-free melt is forwarded into die head 54, and extruded through annular die, resulting in tubing 56 which is 5–40 mils thick, more preferably 20–30 mils thick, still more preferably, about 25 mils thick.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of from about 2 to 10 megarads (hereinafter "MR").

After irradiation, irradiated tubing 70 is directed over guide roll 72, after which irradiated tubing 70 passes into hot water bath tank 74 containing water 76. The now collapsed irradiated tubing 70 is submersed in the hot water for a retention time of at least about 5 seconds, i.e., for a time period in order to bring the film up to the desired temperature, following which supplemental heating means (not illustrated) including a plurality of steam rolls around which irradiated tubing 70 is partially wound, and optional hot air blowers, elevate the temperature of irradiated tubing 70 to a desired orientation temperature, say, from about 240° F.–250° F. or lower. Thereafter, irradiated film 70 is directed through nip rolls 78, and bubble 80 is blown, thereby transversely stretching irradiated tubing 70. Furthermore, while being blown, i.e., transversely stretched, irradiated film 70 is drawn (i.e., in the longitudinal direction) between nip rolls 78 and nip rolls 86, as nip rolls-86 have a higher surface speed than the surface speed of nip rolls 78. As a result of the transverse stretching and longitudinal drawing, irradiated, biaxially-oriented, blown tubing film 82 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, blown tubing 82 is collapsed by rolls 84, and thereafter conveyed through pinch rolls 86 and across guide roll 88, and then rolled onto wind-up roller 90. Idler roll 92 assures a good wind-up.

Figure 7:
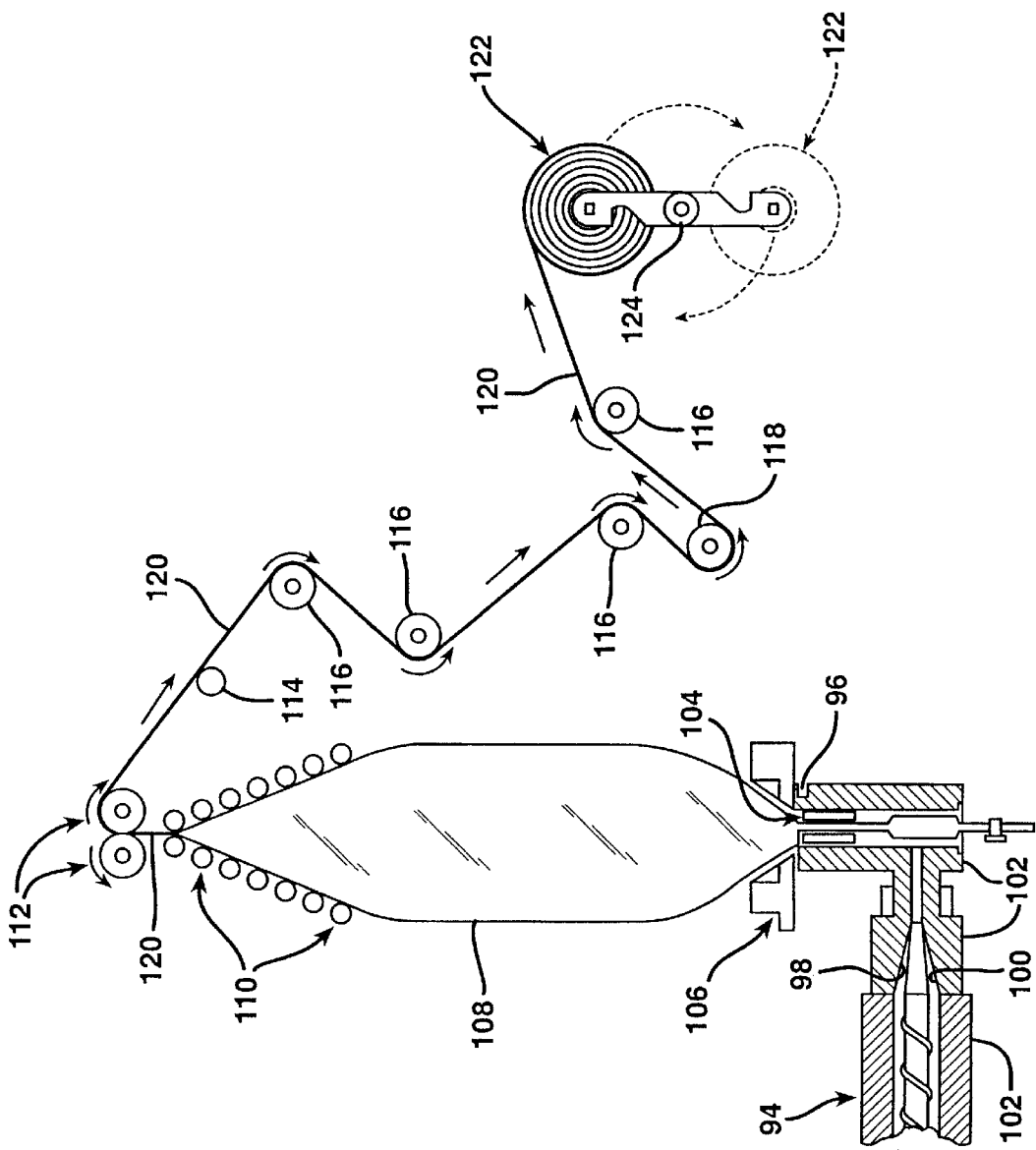
FIG. 7 illustrates a schematic view of an upward blowing process for making a melt oriented, non heat-shrinkable part of the multilayer film of the present invention.

FIG. 7 illustrates a schematic view of another process for making multilayer film for use in the article according to the present invention, and is especially suitable for preparing non heat-shrinkable second component multilayer film. Although for the sake of simplicity only one extruder 94 is illustrated in FIG. 7, there are preferably at least 2 extruders, and more preferably, at least three extruders. That is, preferably at least one extruder, and more preferably two extruders, supply molten polymer to coextrusion die. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 94 as an example, each of the extruders is preferably equipped with a screen pack 98, a breaker plate 100, and a plurality of heaters 102. Each of the coextruded film layers is extruded between mandrel 104 and die 96, and the extrudate is cooled by cool air flowing from air ring 106. The resulting blown bubble which is oriented at or near melt temperature is thereafter guided into a collapsed configuration by nip rolls 112, via guide rolls 110. The collapsed tube is optionally passed over treater bar 114, and is thereafter passed over idler rolls 116, and around dancer roll 18 which imparts tension control to collapsed tube 120, after which the collapsed tube is wound into roll 122 via winding mechanism 124.

Figure 8:
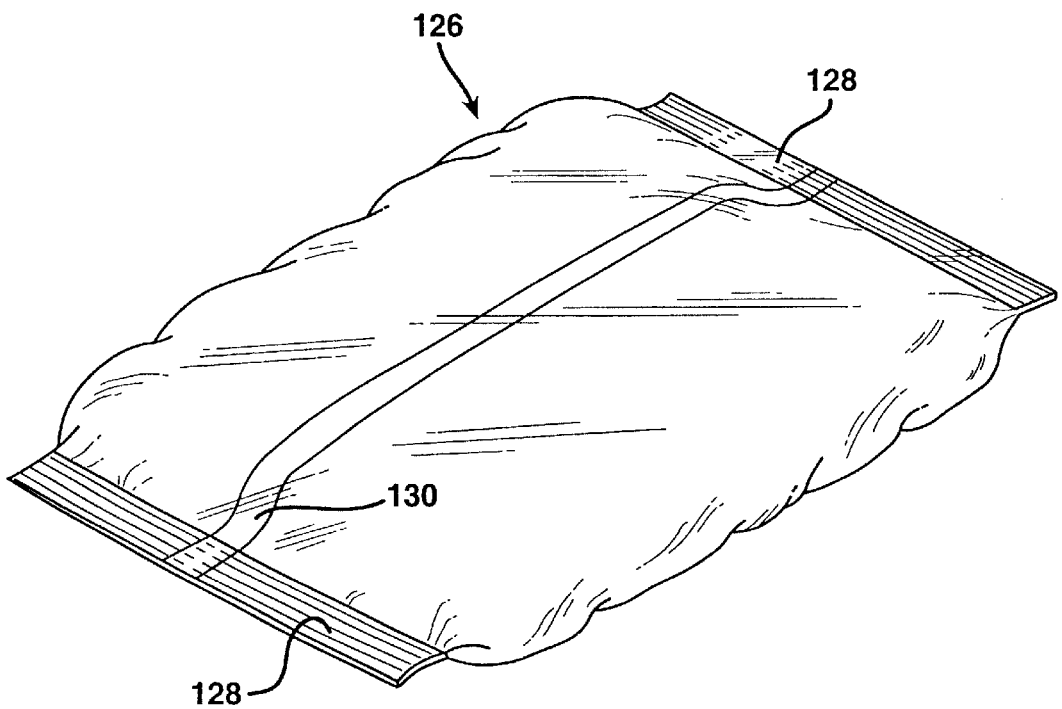
FIG. 8 illustrates a perspective view of a packaged product in accordance with the present invention.

FIG. 8 illustrates a perspective view of packaged product 126 in accordance with the present invention. Packaged product 126 has transverse end seals 128 and longitudinal seal 130, which can be either a lap seal or a fin seal. Packaged product 128 is preferably produced using form-fill-and-seal equipment, and preferably contains a hard, flowable food product, e.g., dry dog food.

Figure 9:
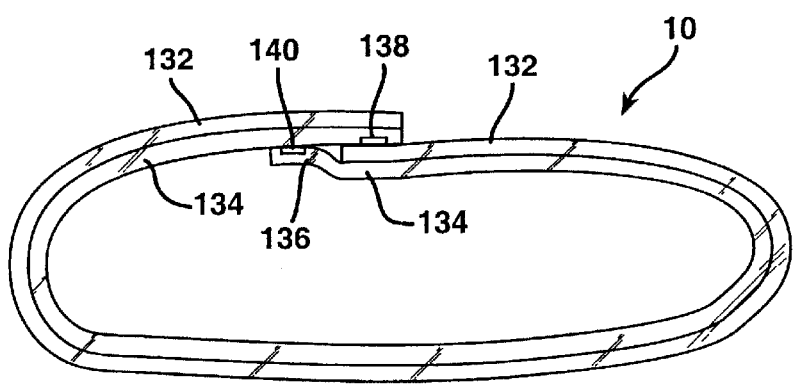
FIG. 9 illustrates a cross-sectional view of the present invention showing an inside to outside lap seal.

This arrangement is illustrated in FIG. 9, which is an enlarged variation of the cross-sectional view of gusseted bag 10 illustrated in FIG. 2B. In FIG. 9, first component film 132 is laminated to second component film 134. Lap seal 138 is formed by heat sealing first component film 132 to second component film 134.

EXAMPLES

Example 1 (Comparative)

The preparation of a comparative two component laminated film comprising an oxygen barrier layer was carried out as follows.

A solid state-oriented, heat-shrinkable multilayer first component multilayer film was prepared using the process illustrated in FIG. 6, discussed above by casting a solid tape using a coextrusion die. The tape outer layer had a major proportion of linear low density polyethylene and a minor portion of an ethylene vinyl acetate. The inner layer was ethylene/vinyl acetate copolymer having a vinyl acetate content of 28 weight percent. In order to prevent the inner layers of tape from self-adhering, the inside surface of the tubular tape was coated powdered cornstarch. The tape was irradiated at 4.0 megarads. The tubular tape was flattened and reheated to 240° F. in an oven, and blown into a bubble. The bubble was expanded to about 3.6× its original dimensions in both the machine and transverse directions. The collapsed and flattened tubing adhered to itself because the expansion of the film reduced the concentration of the corn starch to a level low enough that self-welding would occur. Hence, ply-separation was not required, and a single-wound film roll was produced.

A solid state-oriented, heat-shrinkable second component oxygen barrier multilayer film was produced by casting a solid tape using a coextrusion die, using the process illustrated in FIG. 6, discussed above. The tape was irradiated with about 3 megarads of irradiation. The tape was then heated to about 240° F. in an oven and blown into a bubble. The bubble was expanded to about 3.8× times its original dimensions in both the machine (longitudinal) and transverse directions, and then deflated and ply-separated into single-wound film rolls. The final film had a thickness of about 1.1 mi. The first substrate was corona treated and reverse-printed on a flexography press.

The first component film was then laminated to the second component film, using a polyurethane adhesive. During the laminating process, both component films were corona treated in-line. The corona treatment was done to achieve a dyne level above 40. The corona treatment enhanced the<bond strength between the laminated films. The resulting laminated multilayer film had a thickness of about 5.7 mil.

The laminated multilayer film was then converted into side-gusseted bags and bottom-gusseted bags. A VER-TROD® impulse heat sealing machine was used to manually prepare bags. The machine applied an impulse heat seal in the conversion of the film to bags. The bags were filled with various types of hard, dry dog and cat food, with the product being sealed in the bag. Testing of the packaged product was then conducted Table 1, below, provides the details of the first and second component films, including the identity of the various polymers present in each of the film layers, the arrangement of each of the film layers, the relative proportions of each of the polymers in each of the film layers, and the thickness of each of the film layers. The bag was formed by sealing the second component film to itself to form the gusseted bag.

TABLE 1

| LAYER COMPOSITION | LAYER THICKNESS (mils) |
|---|---|
| First Component Film | |
| 87% LLDPE #1, 10% EVA #2, 3% White Color Concentrate | 1.91 |
| EVA #3 | 0.73 |
| 87% LLDPE #1, 10% EVA #2, 3% White Color Concentrate | 1.89 |
| Laminating Adhesive between First and Second Component Films | |
| Laminating Adhesive | 0.20 |
| Second Component Film | |
| Blend of 49.5% LLDPE #1, 24.75% LLDPE #2, 24.75% EVA #1, and 1% antiblock masterbatch | 0.36 |
| 100% Polymeric Adhesive #1 | 0.12 |
| Blend of 90% EVOH #1, 10% Nylon 6/Nylon 12 Copolymer | 0.13 |
| 100% Polymeric Adhesive #1 | 0.12 |
| Blend of 50% LLDPE #1, 25% LLDPE #2, 10% EVA #1, And 15% Slip/Antiblock Masterbatch | 0.37 |

In Table 1 above:

LLDPE #1 was DOWLEX® 2045 linear low density polyethylene, obtained from Dow Plastics of Freeport, Tex.;

LLDPE #2 was DOWLEX® 2037 linear low density polyethylene, obtained from Dow Plastics of Freeport, Tex.;

EVA #1 was PE 1335 ethylene/vinyl acetate copolymer having a vinyl acetate content about 3.3% by weight, obtained from Rexene;

EVA #2 was ESCORENE® LD 318.92 ethylene vinyl acetate having vinyl acetate content of 9% by weight, obtained from Exxon Chemical Corporation of Houston, Tex., EVA #3 was ESCORENE® LD 761.36 ethylene vinyl acetate having vinyl acetate content of 28%, obtained from Exxon Chemical Corporation of Houston, Tex.;

Nylon 6/Nylon 12 Copolymer was GRILLON® CF-6S, obtained from Emser, of Atlanta, Ga.;

EVOH #1 was EVAL® LC-F101A, obtained from Evalca, of Lisle, Ill.

"Polymeric Adhesive #1" was ADMER® SF 700 A anhydride grafted polyolefins blend, obtained from Mitsui Petrochemicals (America), Ltd., New York, N.Y.;

"Laminating Adhesive" was a solvent-based adhesive of three components by weight; the three components were: 37% ADCOTE® 545-E Adhesive with 60% solids, 3.7% Catalyst F, diisocyanate with 75% solids, and 59.2% ethyl acetate solvent, all three components were obtained from Morton International of Chicago, Ill.; and "White Color Concentrate" was EPE 10214-C OPAQUE WHITE COLOR CONCENTRATE from Teknor of Pawtucket, R.I., "Slip/Antiblock Masterbatch" was a conventional masterbatch containing silica and waxes, for the purpose of improving the slip and antiblock characteristics of the resulting film and "Antiblock Masterbatch #1 was LR 89602 consisting of W210 zeosphere from 3M into LDPE carrier was obtained from Ampacet of Terrytown, N.Y.

Example 2

Laminated Film Containing Blown Barrier Film

Example 1 was repeated except that the second component oxygen barrier multilayer film was prepared by a process in accordance with FIG. 7, discussed above, to provide an upwardly blown film which was oriented at a temperature above the melt point of the polymers extruded, e.g., at approximately 440° F. Three samples were obtained with barrier film gauges of 1.5 mil (Example 2A), 1.25 mil (Example 2B) and 1.15 mil (Example 2C).

TABLE 2

| LAYER COMPOSITION | LAYER THICKNESS (mils) |
|---|---|
| First Component Film | |
| 80% LLDPE #1, 20% White Color Concentrate #1 | 1.91 |
| EVA #3 | 0.68 |
| 80% LLDPE #1, 20% White Color Concentrate #1 | 1.91 |
| Laminating Adhesive between First and Second Component Films | |
| Laminating Adhesive | 0.20 |
| Second Component Film | |
| 100% LDPE #1 | 0.40 |
| 100% Polymeric Adhesive #2 | 0.11 |
| A blend of 80% nylon 6, 20% amorphous nylon | 0.11 |
| EVOH #2 | 0.18 |
| A blend of 80% nylon 6, 20% amorphous nylon | 0.12 |
| 100% Polymeric Adhesive #2 | 0.10 |
| 78% LLDPE #3, 20% LDPE #1, 2% Antiblock Masterbatch #2 | 0.49 |

"LLDPE #3" was Exceed 363C32 obtained from Exxon Chemicals of Baytown, Tex.

"LDPE #1" was a Escorene LD 134.09 obtained from Exxon Chemicals of Baytown, Tex.

for the present invention wherein the second component multilayer barrier film was non heat-shrinkable compared to the solid state-oriented heat-shrinkable barrier film of Comparative Example 1.

TABLE 3

|  | EXAMPLE 2A | | EXAMPLE 2B | | EXAMPLE 2C | | EXAMPLE 1 COMPARATIVE | |
| --- | --- | --- | --- | --- | --- | --- | --- | --- |
| Barrier Film Gauge (Mil) | 1.50 | | 1.25 | | 1.15 | | 1.10 | |
| Lap Seal Strength-TD (lbs./inch) | | | | | | | | |
| Seconds | | | | | | | | |
| 0.5 | 0 | | 0 | | 0 | | 0 | |
| 1 | 7.2 | | 1 | | 4.1 | | 0.7 | |
| 1.5 | 5 | | 6.2 | | 10.5 | | 1.4 | |
| 2 | 6 | | 7.3 | | 13.8 | | 3.2 | |
| Gusset Seal Strength-TD (lbs./inch) | | | | | | | | |
| Seconds | | | | | | | | |
| 0.5 | 0 | | 0 | | 0 | | 0 | |
| 1 | 8.2 | | 8.6 | | 5 | | 0 | |
| 1.5 | 8.4 | | 9 | | 11 | | 0.9 | |
| 2 | 6 | | 9.4 | | 11.8 | | 1.5 | |
|  | MD | TD | MD | TD | MD | TD | MD | TD |
| Laminate Gauge (mil) | 6.07 | — | 5.73 | — | 5.67 | — | 5.7 | — |
| Tensile Strength at Break (psi) | 10366 | 10446 | 10256 | 10613 | 10730 | 9973 | 10016 | 11301 |
| Elongation at Break (%) | 215 | 188 | 238 | 181 | 245 | 189 | 210 | 201 |
| Tensile Modulus (Kpsi) | 50 | 48 | 55 | 56 | 54 | 53 | 36 | 30 |
| Tear Propagation (g) | 298 | 245 | 186 | 119 | 134 | 110 | 138 | 121 |
| Instrumented Impact Strength, Energy at Break (ft-lb) | 4.2 | — | 4.4 | — | 5.0 | — | 4.2 | — |
| Free Shrink @ 125° F. (%) | 1 | 0 | — | — | — | — | 1 | 1 |
| Free Shrink @ 150° F. | 3 | 3 | — | — | — | — | 4 | 5 |
| Free Shrink @ 175° F. | 5 | 7 | — | — | — | — | 8 | 14 |
| Free Shrink @ 200° F. | 10 | 14 | — | — | — | — | 15 | 26 |
| Total Free Shrink @ 125° F. (%) (L + T) | 1 | — | — | — | — | — | 2 | — |
| Total Free Shrink @ 150° F. (%) (L + T) | 6 | — | — | — | — | — | 9 | — |
| Total Free Shrink @ 175° F. (%) (L + T) | 12 | — | — | — | — | — | 22 | — |
| Total Free Shrink @ 200° F. (%) (L + T) | 24 | — | — | — | — | — | 41 | — |
| Outside/Outside COV | Static | Kinetic | Static | Kinetic | Static | Kinetic | Static | Kinetic |
|  | 0.81 | 0.62 | 0.89 | 0.68 | 0.64 | 0.51 | 0.63 | 0.42 |

"Nylon 6" was a Ultramid B35 obtained from BASF of Mount Olive, N.J.

"Amorphous nylon" was Grivory G21 from EMS of Sumter, S.C.

"EVOH #2 was LC-H101BD of EVAL Company of America of Lisle, Ill.

Polymeric Adhesive #2 was Plexar PX114 from Millenium Petrochemicals of Cincinnati, Ohio. "Antiblock Masterbatch #2" was 10853 PE masterbatch with 19.4% diatomaceous silica in LDPE carrier was obtained from Ampacet of Terrytown, N.Y.

The various resins and other compositions listed in TABLE 2 are as identified above for TABLE 1.

TABLES 3 and 4, below, provide various physical property data for the films of Examples 1 (Comparative) and 2. The laminates of the invention exhibited high stiffness (i.e., high modulus), outstanding tear resistance, high gloss, and good printability. Gloss was measured in accordance with ASTM Test No. D 2456 (8.02). Haze, clarity and total light transmission were measured in accordance with ASTM Test No. D 1003-97 (8.01). Seal strength was greatly improved

TABLE 4

| | Gloss 45 degree | Haze (%) | Clarity (%) | Total Transmission(%) |
| --- | --- | --- | --- | --- |
| Example 1 | 83 | 2.5 | 84.6 | 95 |
| Example 2A | 78–82 | 4.3–4.6 | 65 | 93 |
| Example 2B | 76–80 | 4.3–4.9 | 63–67 | 93 |
| Example 2C | 77–81 | 5.5–6.1 | 62–64 | 93 |

Table 5 shows the results of measurement for elastic recovery of the individual first and second components (shrink/shrink) as well as the laminate of multilayer film of Comparative Example 1. These are compared to the first and second components (shrink/non-shrink) as well as the laminate of, the multilayer film of the present invention, Example 2A. The multilayer film of the invention exhibits comparable acceptable elastic recovery.

Elastic recovery of various films was measured both before and after lamination in order to determine how elastic recovery of oriented films was retained or reduced on lamination. Elastic recovery relates to the ability of a package to resume its original shape after being distended during its use cycle, as well as the tightness or snugness of a package. Higher elastic recovery results in reduced permanent deformation. Generally, elastic recovery of unoriented or blown film such as that employed in the second component of the multilayer film of the present invention is poor.

The films were tested by elongating a film specimen at 5 inches/minute to an extension of 10%. After a 60 second wait to relax the crosshead was returned to its original grip position. After three minutes the specimen was retested to the same extension.

Among the films tested, the first component shrink film of the type used in both Examples 1 and 2 exhibited the highest elastic recovery prior to lamination. It maintained high elastic recovery on laminating to the second component shrink film of Example 1. Although the second component non-shrink blown film of the present invention's Example 2A was poor prior to lamination, upon lamination to the first component shrink film it provided an overall composite of good elastic recovery.

TABLE 5

|  | Gauge (mil) | Elastic Recovery (%) | Stress Retention (%) | Permanent Deformation (%) |
|---|---|---|---|---|
| Ex. 1 & 2 Component 1 (Shrink Film) |  |  |  |  |
| MD | 4.68 | 98 | 69 | 2.01 |
| TD | 4.63 | 97 | 65 | 3.4 |
| Ex. 1 Component 2 (Shrink Film) |  |  |  |  |
| MD | 1.08 | 86 | 57 | 13.9 |
| TD | 1.12 | 87 | 56 | 12.6 |
| Ex. 2 Component 2 (Non-shrink) |  |  |  |  |
| MD | 1.48 | 77 | 58 | 22.9 |
| TD | 1.47 | 75 | 59 | 24.9 |
| Ex. 1 (Comp.) Laminate |  |  |  |  |
| MD | 5.91 | 96 | 66 | 4.03 |
| TD | 5.89 | 93 | 64 | 7.17 |
| Ex. 2 Laminate |  |  |  |  |
| MD | 6.00 | 91 | 67 | 8.86 |
| TD | 6.17 | 88 | 64 | 12.0 |

In the laminated films above which are used to make a gusseted bag in accordance with the present invention, the layer sealed to itself to form the gusseted bag preferably is a layer which does not comprise the slip agent. It has been found that if the layer containing the slip agent is sealed to itself, the resulting seal has significantly lower seal strength than if a layer free of slip agent is sealed to itself.

Although the present invention has been described in connection with the preferred embodiments, it is to be understood that modifications and variations may be utilized without departing from the principles and scope of the invention, as those skilled in the art will readily understand Accordingly, such modifications may be practiced within the scope of the following claims.

What is claimed is:

1. A two-component laminated multilayer film which comprises:
   I. a first component comprising:
      (A) an outer first film layer comprising ethylene/alpha-olefin copolymer;
      (B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;
      (C) an optional third film layer comprising ethylene/alpha-olefin copolymer; and
   II. a non heat-shrinkable second component laminated to said first component, said second component comprising:
      (D) an outer fourth film layer which comprises at least one member selected from the group consisting of ethylene/alpha-olefin copolymer and ethylene/unsaturated ester copolymer;
      (E) a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester;
      (F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and
      (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

wherein the multilayer film is heat sealable to at least one member selected from the group consisting of itself and another film, and said outer fourth film layer is heat sealable to itself as well as to said outer first film layer, said multilayer film has a total thickness of at least 2 mils, an impact strength of at least about 3 ft-lbs, an elongation at break of less than 300%, a tear propagation of at least 50 grams, a tensile modulus of at least 45,000 psi, and total free shrink at 180° F. of from 5 to 50 percent.

2. The multilayer film of claim 1 wherein said first component is heat-shrinkable and heat sealable to itself, and said multilayer film has a tensile strength at break of at least 8000 pounds per square inch, a total free shrink at 180° F. of from about 5 to 50 percent, a total elastic recovery of at least 80%, and said multilayer film having a first component to second component seal strength of at least 4 pounds/inch on an impulse heat sealing machine.

3. The multilayer film of claim 2 wherein:
   (a) the first film layer is directly adhered to the second film layer;
   (b) the third film layer is directly adhered to the second film layer;
   (c) the third film layer is between the second film layer and the fourth film layer; and
   (d) the film further comprises an adhesive between the third film layer and the fourth film layer.

4. The multilayer film of claim 2 wherein said first component comprises a downward cast solid state oriented film biaxially oriented to a total orientation of from about 9× to 16× at a temperature of from about 200° to 280° F., and said second component comprises a melt-oriented blown film.

5. The multilayer film of claim 1 having a first component to second component seal strength of at least 4 pounds/inch on an impulse heat sealing machine.

6. The multilayer film of claim 5 having a first component to second component seal strength of at least 6 pounds/inch on an impulse heat sealing machine.

7. The multilayer film of claim 2 having a second component to second component seal strength of at least 8 pounds/inch on an impulse heat sealing machine.

8. The multilayer film of claim 2 wherein at least one of said film layers comprises pigment, and said second component has an outside surface which contains no added antiblock additive and no added slip additive, and said second component is no greater than 1.5 mil thick.

9. The multilayer film of claim 2 wherein said first component comprises a crosslinked polymer network.

10. The multilayer film of claim 2 having a tear propagation of 100 to 300 grams, an outside surface having a gloss of at least 70 percent, a static COF of at least 0.6 and a kinetic COF of at least 0.5, as measured between outer fourth film layer surfaces.

11. The multilayer film of claim 2 wherein trap printing is present between the third layer and the fourth layer.

12. A sealed article comprising a two-component laminated multilayer film which comprises:
   I. a first component comprising:
      (A) a first film layer which is an inside film layer comprising ethylene/alpha-olefin copolymer;
      (B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;
      (C) an optional third film layer comprising ethylene/alpha-olefin copolymer; and
   II. a non heat-shrinkable second component laminated to said first component, said second component comprising:
      (D) a fourth film layer which comprises at least one member selected from the group consisting of ethylene/alpha-olefin copolymer and ethylene/unsaturated ester copolymer;
      (E) a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester; (F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and
      (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

wherein the article comprises a heat seal of the film to at least one member selected from the group consisting of itself and another film; and a surface of said second component is heat sealable to itself as well as to said inside layer (A) of said first component, and said multilayer film has a total thickness of at least 2 mils, an impact strength of at least about 3 ft-lbs, an elongation at break of less than 300%, a tear propagation of at least 50 grams, a tensile modulus of at least 45,000 psi, and total free shrink at 180° F. of from 5 to 50 percent.

13. The article of claim 12 wherein said first component is heat-shrinkable and heat sealable to itself, said second component comprises a non heat-shrinkable film, the seal is a heat seal, said fourth layer is an outside film layer and wherein the multilayer film has a tensile strength at break of at least 8,000 pounds per square inch, a total free shrink at 180° F. of from about 5 to 50%, a total elastic recovery of at least 80%, and said multilayer film having a first component to second component seal strength of at least 4 pounds/inch on an impulse heat sealing machine.

14. The article of claim 13 wherein said first component comprises a downward cast solid state oriented film biaxially oriented to a total orientation of from about 9× to 16× at a temperature of from about 200° to 280° F., and said second component comprises a melt-oriented blown film.

15. The article of claim 12 wherein at least one of said film layers comprises pigment, said second component has an outside surface which contains no added antiblock additive and no added slip additive, said second component is no greater than 1.5 mil thick, said multilayer film has a tear propagation of 100 to 300 grams, an outside surface having a gloss of at least 70 percent, a static COF of at least 0.6, a kinetic COF of at least 0.5 as measured from outside to outside, and wherein trap printing is present between the third layer and the fourth layer.

16. The article according to claim 12, wherein the article is selected from the group consisting of an end-seal bag, a side-seal bag, and a gusseted bag.

17. A packaged product comprising a two-component laminated multilayer film which comprises:
   I. a first component comprising:
      (A) a first film layer which is an inside film layer comprising ethylene/alpha-olefin copolymer;
      (B) an optional second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;
      (C) an optional third film layer comprising ethylene/alpha-olefin copolymer; and
   II. a non heat-shrinkable second component laminated to said first component, said second component comprising:
      (D) a fourth film layer which comprises at least one member selected from the group consisting of ethylene/alpha-olefin copolymer and ethylene/unsaturated ester copolymer;
      (E) a fifth film layer which serves as an 02-barrier layer, the fifth film layer being between the third film layer and the fourth film layer, the fifth film layer comprising at least one-member selected from the group consisting of PVDC, EVOH, polyalkylene carbonate, polyacrylonitrile, polyamide, and polyester;

(F) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer; and (G) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

wherein the packaged product comprises a heat seal of the film to at least one member selected from the group consisting of itself and another film; and a surface of said second component is heat sealable to itself as well as to said inside layer (A) of said first component, and said multilayer film has a total thickness of at least 2 mils, an impact strength of at least about 3 ft-lbs, an elongation at break of less than 300%, a tear propagation of at least 50 grams, a tensile modulus of at least 45,000 psi, and total free shrink at 180° F. of from 5 to 50 percent.

18. The product of claim 17 wherein said first component is heat-shrinkable and heat sealable to itself, said fourth layer is an outside film layer, a tensile strength at break of at least 8,000 pounds per square inch, a total free shrink at 180° F. of from about 5 to 50%, a total elastic recovery of at least 80%, and having a first component to second component seal strength of at least 4 pounds/inch on an impulse heat sealing machine, and wherein the product comprises hard, flowable, particulates.

* * * * *